3,219,524
METHOD FOR KILLING FUNGI WITH TRICHLORO HYDROXY PHTHALANE

Hans Feichtinger, Dinslaken, Germany, assignor to Ruhrchemie Aktiengesellschaft, Oberhausen-Holten, Germany, a corporation of Germany
No Drawing. Original application Oct. 29, 1962, Ser. No. 233,900. Divided and this application Oct. 8, 1964, Ser. No. 406,209
Claims priority, application Germany, Nov. 4, 1961, R 31,404
2 Claims. (Cl. 167—33)

This is a division of application Serial No. 233,900, filed October 29, 1962.

This invention relates to and has as its object the production of 4,5,6-trichloro-7-hydroxyphthalane.

The production of 4,5,6,7 - tetrachloro-4,7-endoxo-4,7,8,9-tetrahydrophthalane by Diels-Alder addition of 2,5-dihydro-furane to tetrachlorofurane is known (United States Patent 2,882,199) and proceeds as follows:

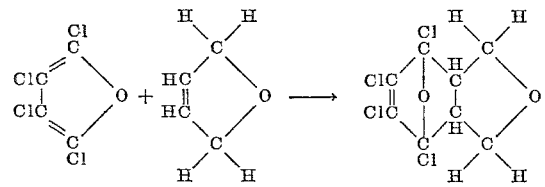

Because of the small steric requirement, the Diels-Alder addition results in the production of both an endo- and and exo-compound. Therefore, the product of the synthesis is a mixture of compounds of the following structural formulae:

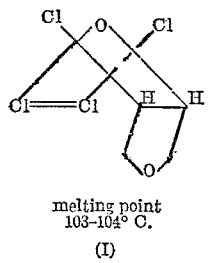

melting point
103–104° C.
(I)

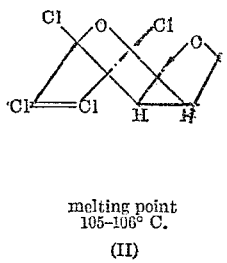

melting point
105–106° C.
(II)

If the addition product is to be further processed, the mixture of stereoisomeric Compounds I and II of 4,5,6,7-tetrachloro-4,7-endoxo-4,7,8,9-tetrahydro-phthalane must be separted by a complicated chromotographic process or else the mixture of Compounds I and II has to be used per se as starting material. In the latter instance, it is obvious that a well defined uniform reaction with a well defined reaction product cannot be effected. For instance, if the endoxo mixture is subjected to further chlorination, a multiple number of compounds are obtained.

In accordance with the invention, it has now been found that a mixture of the endo-and the exo-form of 4,5,6,7 - tetrachloro - 4,7 - endoxo - 4,7,8,9 - tetrahydrophthalane can be converted into a well defined uniform compound, and namely into 4,5,6-trichloro-7-hydroxyphthalane, by heating the mixture of the stereoisomeric forms I and II of 4,5,6,7-tetrachloro-4,7-endoxo-4,7,8,9-tetrahydrophthalane with 30 to 39% hydrochloric acid at an elevated temperature and an elevated pressure and thereafter recovering the 4,5,6 - trichloro - 7 - hydroxy-phthalane from the reaction mixture formed.

The conversion is advantageously effected using the hydrochloric acid in amount of 5 to 50 fold and preferably of 7 to 20 fold by weight of the initial phthalane.

The reaction is expediently carried out by heating the mixture of the endo-and the exo-form of 4,5,6,7-tetrachloro - 4,7 - endoxo - 4,7,8,9 - tetrahydrophthalane and hydrochloric acid for several hours, for instance 1 to 12 hours, preferably 4 to 10 hours, at temperatures of from 100 to 180° C. and preferably of from 130 to 150° C. in a closed system.

The process according to the invention is carried out at pressures amounting to from 5 to 50 atmospheres.

Heating the mixture of the endo-and exo-forms of 4,5,6,7 - tetrachloro - 4,7 - endoxo - 4,7,8,9 - tetrahydrophthalane with hydrochloric acid according to the invention results in the hydrolytic cleavage of the oxygen bridge and aromatization of the system, whereby 4,5,6-trichloro-7-hydroxy-phthalane is formed as the sole conversion product. The 4,5,6 - trichloro - 7 - hydroxy - phthalane formed has a melting point of 227.5 to 228° C. The yield obtained corresponds approximately to the theoretically calculated amount.

It is to be considered highly surprising and entirely unexpected that the simple treatment of the mixture of 4,5,6,7 - tetrachloro - 4,7 - endoxo - 4,7,8,9 - tetrahydrophthalane according to the invention results in a high yield of a uniform product as here obtained.

The process of the invention allows the direct conversion of the mixture of endo- and exo-forms of 4,5,6,7-tetrachloro - 4,7 - endoxo - 4,7,8,9 - tetrahydrophthalanes with the elimination of the uneconomical processing by chromatographic separation which involves much loss, into a uniform project.

The conversion reaction proceeds according to the following equation wherein the stereoisomeric formulae of the two compounds I and II of the starting material are represented by a single formula which is obtained by projecting formulae I and II into the paper plane.

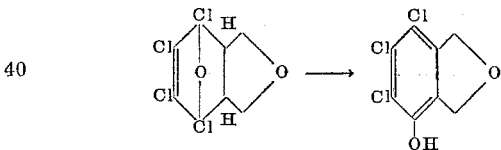

The reaction product is recovered from the reaction mixture in the conventional manner as, for example, by separating the liquid from the solids present in the reaction mixture and recrystallizing the residue for obtaining 4,5,6-trichloro-7-hydroxy-phthalane.

The 4,5,6 - trichloro - 7 - hydroxy - phthalane in accordance with the invention is distinguished by an exceptionally high fungicidal activity and is extremely valuable for combatting undesirable fungi. The 4,5,6-trichloro-7-hydroxy-phthalane may be used alone or in any desired conventional admixture as a fungicide.

The following example is given by way of illustration and not limitation.

EXAMPLE 27.6 g. (0.10 mol) 4,5,6,7 - tetrachloro - 4,7 - endoxo-4,7,8,9-tetrahydrophthalane comprising a mixture of the endo- and exo-forms I and II and 200 ml. concentrated hydrochloric acid were heated to 130° C. in an autoclave. Following a reaction time of 8 hours, the liquid was separated from the solids present in the reaction mixture by suction and the latter washed with water until free of acid. The dried residue amounting to 23.9 g. had a melting point of 215–217° C. A single recrystallization from ethyl acetate resulted in the formation of 4,5,6 - trichloro-7-hydroxy-phthalane having a melting point of 227.5–228° C. The raw yield was quantitative.

$C_8H_5O_2Cl_3$ (239.49):

|    | Calculated | Found |
|----|------------|-------|
| C  | 40.14      | 40.21 |
| H  | 2.10       | 2.18  |
| O  | 13.36      | 13.10 |
| Cl | 44.40      | 44.20 |

On reaction with phenylisocyanate, a phenylurethane having a melting point of 179 to 180.5° C. was obtained.

The uniform compound obtained in accordance with the invention shows fungicidal activity. The uniform compound is especially suited for use in inhibiting or fully suppressing the growth of various fungi.

The activity of the hydroxy-phthalane in accordance with the invention was determined by means of the so called "plate test" utilizing in the test, fungi grown on a beer wort-agar-agar nutrient. As comparison, the effect on fungi growth of zinc-ethylene-bis-dithiocarbamate fungicide was simultaneously determined. The hydroxy phthalane in accordance with the invention and zinc-ethylene-bis-dithiocarbamate were both used in dilutions of 1:1,000 and 1:10,000. The results of the tests are shown in the following tables. In the tables 25, 50, 75, and 100% inhibition of the matted growth of the respective fungi on the nutrient are given as a function of the time of exposure and the dosage of the active substance. If the substance to be tested suppresses the growth of the respective fungi beyond the area of the nutrient covered by the paper-plate impregnated with the solution of the fungicidal active compound, the effect is expressed by an estimated value, i.e. > 100%.

ASPERGILLUS NIGER

| Fungicidally active compound | Percent inhibition of the matted growth after 2, 3 and 6 days at dilution ratio of— | | | | | |
|---|---|---|---|---|---|---|
| | 1:1,000 | | | 1:10,000 | | |
| | 2 | 3 | 6 | 2 | 3 | 6 |
| 4,5,6-trichloro-7-hydroxy-phthalane | 100 | 100 | 100 | 25 | 0 | 0 |
| Zinc-ethylene-bis-dithiocarbamate | 25 | 25 | 0 | 0 | 0 | 0 |

ASPERGILLUS ORYCAE

| Fungicidally active compound | Percent inhibition of the matted growth after 2, 3 and 6 days at dilution ratio of— | | | | | |
|---|---|---|---|---|---|---|
| | 1:1,000 | | | 1:10,000 | | |
| | 2 | 3 | 6 | 2 | 3 | 6 |
| 4,5,6-trichloro-7-hydroxy-phthalane | 100 | 100 | 100 | 50 | 25 | 0 |
| Zinc-ethylene-bisdithiocarbamate | 100 | 0 | 0 | 0 | 0 | 0 |

PENICILLIUM ROQUEFORTII

| Fungicidally active compound | Percent inhibition of the matted growth after 2, 3 and 6 days at dilution ratio of— | | | | | |
|---|---|---|---|---|---|---|
| | 1:1,000 | | | 1:10,000 | | |
| | 2 | 3 | 6 | 2 | 3 | 6 |
| 4,5,6-trichloro-7-hydroxy-phthalane | >100 | 100 | 100 | 100 | 100 | 50 |
| Zinc-ethylene-bisdithiocarbamate | 100 | 75 | 25 | 100 | 25 | 0 |

ALTERNARIA TENUIS

| Fungicidally active compound | Percent inhibition of the matted growth after 2, 3 and 6 days at dilution ratio of— | | | | | |
|---|---|---|---|---|---|---|
| | 1:1,000 | | | 1:10,000 | | |
| | 2 | 3 | 6 | 2 | 3 | 6 |
| 4,5,6-trichloro-7-hydroxy-phthalane | >100 | >100 | 100 | 100 | 75 | 25 |
| Zinc-ethylene-bisdithiocarbamate | 100 | 0 | 0 | 0 | 0 | 0 |

FUSARIUM DIANTHI

| Fungicidally active compound | Percent inhibition of the matted growth after 2, 3 and 6 days at dilution ratio of— | | | | | |
|---|---|---|---|---|---|---|
| | 1:1,000 | | | 1:10,000 | | |
| | 2 | 3 | 6 | 2 | 3 | 6 |
| 4,5,6-trichloro-7-hydroxy-phthalane | >100 | >100 | 100 | 100 | 100 | 50 |
| Zinc-ethylene-disdithiocarbamate | 100 | 100 | 75 | 0 | 0 | 0 |

The 4,5,6 - trichloro - 7 - hydroxyphthalane in accordance with the invention may be used for combatting other noxious fungi, especially phytopathogenic fungi. As mentioned above, it is used in the conventional manner for fungicides, namely together with liquid or solid diluents well known in the art. Thus, for example, it may be formed into a fungicidal spray by dissolving or dispersing the same in the conventional liquid carrier materials for fungicides, eventually with addition of commercially available emulsifiers, dispersants, detergents or adhesives, further it may be formed into an aerosol in the conventional manner or into a dusting powder by admixture with a commercially available inert solid carrier material.

I claim:

1. A method which comprises applying to fungi a fungicidal amount of a component having the structural formula

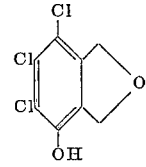

2. A method which comprises applying to fungi a fungicidal composition of matter comprising a carrier with a compound having the structural formula

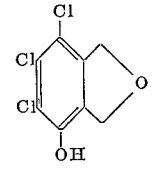

as the active ingredient, the active ingredient being present in an amount sufficient to provide the desired fungicidal activity.

References Cited by the Examiner

UNITED STATES PATENTS

| 2,861,919 | 11/1958 | Gilbert | 167—33 |
| 2,875,124 | 2/1959 | Gaertner et al. | 167—33 |
| 2,879,275 | 3/1959 | Feichtinger et al. | 260—346.2 |
| 3,000,907 | 9/1961 | Feichtinger et al. | 260—346.2 |

JULIAN S. LEVITT, *Primary Examiner.*

UNITED STATES PATENT OFFICE
CERTIFICATE OF CORRECTION

Patent No. 3,219,524  November 23, 1965

Hans Feichtinger

It is hereby certified that error appears in the above numbered patent requiring correction and that the said Letters Patent should read as corrected below.

Column 1, line 32, for "and", second occurrence, read -- an --; line 51, for "chromotographic" read -- chromatographic --; column 4, second table, first column, line 3 thereof, for "disdithiocar-" read -- bisdithiocar- --; line 43, for "component" read -- compound --.

Signed and sealed this 20th day of September 1966.

(SEAL)
Attest:

ERNEST W. SWIDER
Attesting Officer

EDWARD J. BRENNER
Commissioner of Patents